H. H. & C. W. BRISTOL.
MEASURING INSTRUMENT.
APPLICATION FILED NOV. 12, 1917.

1,287,860.

Patented Dec. 17, 1918.

INVENTORS
Howard H. Bristol
Carlton W. Bristol
BY
ATTORNEY

UNITED STATES PATENT OFFICE.

HOWARD H. BRISTOL AND CARLTON W. BRISTOL, OF NAUGATUCK, CONNECTICUT, ASSIGNORS TO THE BRISTOL COMPANY, OF WATERBURY, CONNECTICUT, A CORPORATION OF CONNECTICUT.

MEASURING INSTRUMENT.

1,287,860.          Specification of Letters Patent.      Patented Dec. 17, 1918.

Application filed November 12, 1917. Serial No. 201,649.

*To all whom it may concern:*

Be it known that we, HOWARD H. BRISTOL and CARLTON W. BRISTOL, citizens of the United States, and residents of Naugatuck, in the county of New Haven and State of Connecticut, have invented certain new and useful Improvements in Measuring Instruments, of which the following is a specification.

The invention relates to measuring instruments of the type employing an expansible pressure member, one end of which is free to move under variations in pressure, for example, of the type disclosed in U. S. Letters Patent No. 1,106,341, and wherein the movement of the free end of the pressure member is employed to correspondingly actuate a suitable measuring arm to afford indications of the pressure applied. It has been found that in low range instruments of this character, due to the fact that the one end is perfectly free and unattached, errors may be introduced when the instrument is employed in positions or subjected to treatment disturbing the normal location of the mechanism of said instrument, that is, with the longitudinal axis of its expansible pressure member substantilly vertical and the free end depending. For example, an instrument of the character set forth in the aforesaid Letters Patent may be employed to determine the velocity of a moving body, as an airplane, by subjecting the expansible pressure member thereof to a differential pressure, which is a function of the velocity of said airplane. When thus employed, it will be readily understood that the measuring instrument will assume various positions; and unless some means, for example of the character hereinafter set forth, are provided, would give erroneous indications when its longitudinal axis is displaced substantially from the normal vertical position or when the instrument is inverted.

The present invention has for its object to provide such means in connection with measuring instruments of the character set forth, and at the same time insure a rigid and simple construction which will afford proper indications under all conditions likely to be met with. To this end, there is provided, first, means to prevent undue lateral movement of the free end of the pressure member; and, secondly, suitable counterbalancing means are secured to the said member to insure that the same will maintain its proper length and position relatively to a responsive and measuring member.

In the accompanying drawings, which illustrate the invention—

Similar characters of reference designate corresponding parts throughout the several views.

Figure 1:
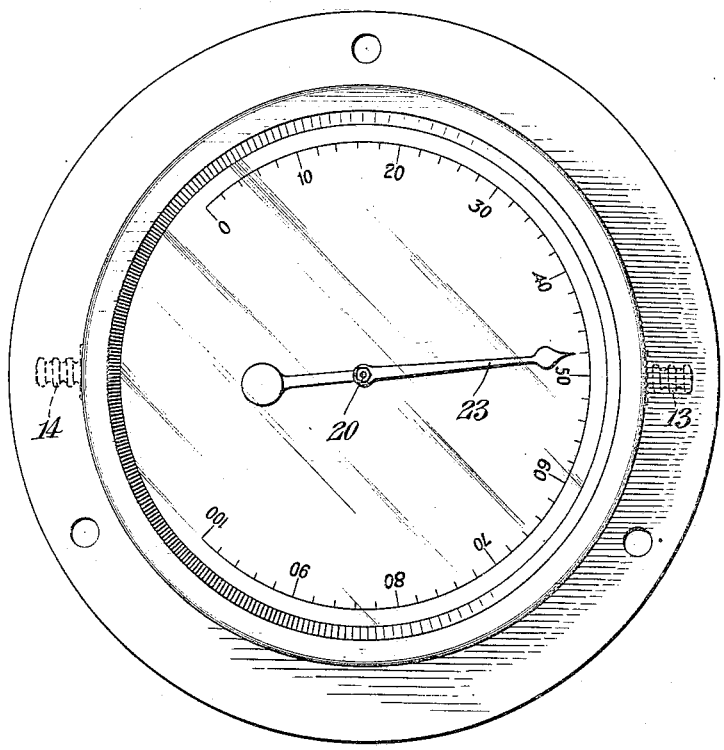
Figure 1 is a plan of the measuring instrument.
Figure 2:
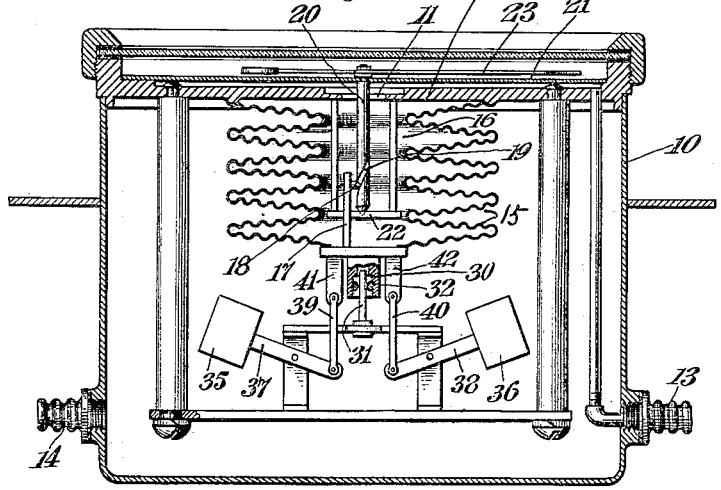
Fig. 2 is a vertical section therethrough.

Referring to the drawings, 10 designates a suitable casing for the instrument, and is provided with a central circular opening 11 in a plate 12, which plate divides the casing into two compartments. An inlet 13 is provided to the one compartment through which the latter may be connected with one of the sources of pressure; or, as the case may be, simply opened to the atmosphere. A similar inlet 14 is provided for the other compartment.

Centrally disposed within this casing is an expansible pressure member, preferably consisting of a plurality of flexible, superposed diaphragms 15. As shown, the said diaphragms are secured to one another, and the one end of the series is fixedly secured to the plate 12, the entire series depending from said plate, and the inner end thereof remaining free to move under variations of pressure to which the diaphragms as a whole are subjected. Furthermore, the diaphragms, with the exception of that at the free end, are centrally perforated to provide a centrally disposed cylindrical opening 16 through the series, said opening registering with the opening 11 aforesaid.

To the free end of the series of diaphragms is fixedly secured a rod 17 of sufficiently rigid material, said rod extending into the cylindrical opening 16 and partaking of the motion of the diaphragms. The rod at its free end has a projection directed toward the longitudinal axis of the diaphragms, and retains a spring-urged ball or other engaging member 18 which is designed to engage a spiral groove or thread 19 of a rotatable member 20. This member is rotatably mounted as in a cover or dial plate 21 secured to the plate 12, and a bearing 22 suspended from the plate 12. The pitch of the thread 19 is such as to give the desired rotation to the rotatable member 20 when the ball 18 is moved relatively thereto in the direction of the longitudinal axis of the diaphragms, due to the corresponding motion of the free end of the series of diaphragms.

A suitable indicating arm or pointer 23 is secured to the rotatable threaded member 20 near its outer end, the same being adapted to travel over a graduated dial plate 21. It is to be understood, of course, that although the invention is herein shown as applied merely to an indicating gage, it is equally applicable to a recording gage. As the diaphragms move inwardly and outwardly under the influence of the difference of pressures exerted thereon by the introduced fluid or fluids, the free end of the series of diaphragms will be correspondingly reciprocated, and will communicate its motion to the rotatable member 20 as aforesaid to effect the rotary movement thereof and of its attached pointer or arm 23. It will be appreciated that should said free end partake of any undue lateral motion, the indicating arm or pointer 23 will be affected; and the outermost diaphragm is, therefore, provided with a recess or socket 30 into which fits a rigid guide pin 31 attached to a suitable support carried by the plate 12. It is preferred to fit within the said recess an annular bearing member 32, sufficient play being allowed only between the said bearing member and the guide pin to permit of perfect freedom of motion of said diaphragms in the direction of their longitudinal axis, and thus insure against any undue lateral play.

Furthermore, where the longitudinal axis of the diaphragms is likely to be displaced considerably from a vertical position, or inverted, as, for example, in employing the measuring instrument to measure the velocity of an airplane, it is desirable to provide means to render the instrument independent of position and provide against excessive vibration of the pointer by counterbalancing the weight and the tendency of the series of diaphragms to change its length and to sag to one side or the other, the effect being particularly aggravated where the instrument is partly or entirely inverted. To this end, there is located upon either side of the longitudinal axis of said diaphragms counterweights 35 and 36, said counterweights being secured to the outer end of levers 37 and 38 respectively, which are fulcrumed to a support carried by plate 12. The inner ends of the said levers are connected through links 39 and 40 with corresponding arms 41 and 42 depending from the lowermost diaphragm; and the points of attachment of the lever ends to said links are arranged, preferably, to be beyond (with respect to the pressure member) the fulcrums of said levers. Thereby, no matter what position the instrument may assume, for the working range of the instrument the particular length of the series of diaphragms corresponding to a definite pressure will remain the same, as any tendency to elongate or contract will be counteracted by the weights 35 and 36 which are proportioned accordingly.

We claim:

1. A measuring instrument, comprising: an expansible pressure member free at one end; a measuring member, and intermediate mechanism to actuate same through the movement of the said free end under variations of pressure; and means connected with said expansible pressure member to counterbalance its weight and to insure against change of length thereof irrespective of the position of the measuring instrument.

2. A measuring instrument, comprising: a casing; an expansible pressure member secured at one end to the casing and free at the other end; a measuring member, and intermediate mechanism to actuate same through the movement of the said free end under variations of pressure; and counterbalancing means pivotally secured to the casing and attached to the free end of said expansible pressure member.

3. A measuring instrument, comprising: a casing; an expansible pressure member secured at one end to the casing and free at the other end; a measuring member, and intermediate mechanism to actuate same through the movement of the said free end under variations of pressure; and a counterweight located upon one side of the longitudinal axis of said pressure member, and a counter-weight located upon the opposite side of said axis, said counter-weights being pivotally connected to the expansible pressure member and fulcrumed to the said casing.

4. A measuring instrument, comprising: a casing; an expansible pressure member secured at one end to the casing and free at the other end; a measuring member, and intermediate mechanism to actuate same through the movement of the said free end under variations of pressure; two levers fulcrumed to said casing; a weight at the free end of each of said levers, said levers being located upon opposite sides of the longitudinal axis of the pressure member; arms extending from the free end of said pressure member; and links connecting the respective arms with the other ends of the corresponding levers, said points of attachment to the levers being beyond (with respect to the pressure member) the fulcrums of said levers.

5. A pressure gage, comprising: a suitably perforated casing; a plurality of perforated diaphragms forming an expansible pressure member secured at one end to the casing and adapted to vary in length under pressure variations, the perforations of said diaphragms registering with that of said casing, and the other end of said expansible member being free to move in the line of its axis and provided with a recess substantially in the longitudinal axis of said diaphragms; a member secured to the said free end of the expansible member and extending into the perforations of the diaphragms; a member within the perforations of said diaphragms, rotatably mounted in the casing and engaged by said member extending from the free end of the diaphragms to be oscillated thereby; a measuring arm attached to said rotatable member to move over the said casing as the expansible member varies in length; and a member secured to said casing, fitting within said recess of the free end of the expansible pressure member to allow of slight lateral play thereof and permit freedom of motion of said pressure member in the direction of its longitudinal axis.

6. A pressure gage, comprising: a suitably perforated casing; a plurality of perforated diaphragms forming an expansible pressure member secured at one end to the casing and adapted to vary in length under pressure variations, the perforations of said diaphragms registering with that of said casing, and the other end of said expansible member being free to move in the line of its axis and provided with a recess substantially in the longitudinal axis of said diaphragms; a member secured to the said free end of the expansible member and extending into the perforations of the diaphragms; a member within the perforations of said diaphragms, rotatably mounted in the casing and engaged by said member extending from the free end of the diaphragms to be oscillated thereby; a measuring arm attached to said rotatable member to move over the said casing as the expansible member varies in length; a member secured to said casing, fitting within said recess of the free end of the expansible pressure member to allow of slight lateral play thereof and permit freedom of motion of said pressure member in the direction of its longitudinal axis; and a counter-weight located upon one side of the longitudinal axis of said pressure member, and a counter-weight located upon the oposite side of said axis, said counter-weights being pivotally connected to the expansible pressure member and fulcrumed to the said casing.

Signed at Waterbury, in the county of New Haven and State of Connecticut, this 7th day of November, A. D. 1917.

HOWARD H. BRISTOL.
CARLTON W. BRISTOL.

Witnesses:
JOHN J. CARNEY,
WM. H. BRISTOL.